United States Patent [19]

Rainal

[11] Patent Number: 5,689,356
[45] Date of Patent: Nov. 18, 1997

[54] SYSTEM AND METHOD FOR MINIMIZING NONLINEAR DISTORTION IN OPTICAL COMMUNICATION SYSTEMS EMPLOYING LASER INTENSITY MODULATION

[75] Inventor: Attilio Joseph Rainal, Morristown, N.J.

[73] Assignee: Lucent Technologies Inc., Murray Hill, N.J.

[21] Appl. No.: 687,764

[22] Filed: Jul. 26, 1996

Related U.S. Application Data

[63] Continuation of Ser. No. 382,552, Feb. 2, 1995, abandoned.
[51] Int. Cl.$^6$ ................................................... H04B 10/04
[52] U.S. Cl. ........................... 359/181; 372/38; 359/180
[58] Field of Search ................ 359/180, 181–186, 359/161, 124–125, 136–137; 372/29, 31, 38

[56] References Cited

U.S. PATENT DOCUMENTS

| | | | |
|---|---|---|---|
| 3,949,317 | 4/1976 | Crosby | 330/28 |
| 5,020,049 | 5/1991 | Bodeep et al. | 370/3 |
| 5,227,908 | 7/1993 | Henmi | 359/181 |
| 5,241,552 | 8/1993 | Bergmann | 372/38 |
| 5,335,107 | 8/1994 | Georges et al. | 359/181 |
| 5,339,187 | 8/1994 | Nelson | 359/181 |

FOREIGN PATENT DOCUMENTS 61-262327  11/1986  Japan .

OTHER PUBLICATIONS

Frigo, "A Model of Intermodulation Distortion in Non–Linear Multicarrier Systems", *IEEE Transactions on Communications*, vol. 42, No. 2/3/4, Feb. 1994.

Frigo et al, "Clipping Distortion in AM–VSB CATV Subcarrier Multiplexed Lightware Systems", IEEE Photonics Technology Letters, vol. 4, No. 7, Jul. 1992.

Shi et al "An Alternative Model for Laser Clipping–Induced Nonlinear Distortion for Analog Lightware CATV Systems," IEEE Photonics, vol. 4, No. 7, Jul. 1992.

Saleh, "Fundamental limit on number of channels in Subcarrier–Multiplexed Lightwave CATV System", Electronics Letters, Jun. 1989, vol. 25, No. 12.

A.J. Rainal, Bandwidth from a Large Excursion of Gaussian Noise, IEEE Transactions and Measurement, vol. 40, No. 4, Aug. 1991.

Reinhard Reimann and Hans–Martin Rein, Bipolar High–Gain Limiting Amplifier IC for Optical–Fiber Receivers Operating up to 4Gbit/s, IEEE Journal of Solid–State Circuits, vol. SC–22, No. 4, Aug. 1987.

Haruo Yonetani, et al., Transmission Characteristics of DFB Laser Modules for Analog Applications, Journal of Lightwave Technology, vol. 11, No. 1, Jan. 1993.

Optical Sources, pp. 158–159 and pp. 170–178.

Optical Receiver Operation, pp. 304–308.

*Primary Examiner*—Leo Boudreau
*Assistant Examiner*—Bhavesh Mehta

[57] ABSTRACT

An amplitude limiting circuit is utilized to select the most favorable linear region of the light vs. current characteristic curve (for directly modulated lasers) or the lasers modulator transfer function (for externally modulated lasers) by preventing excursions of the broadband, multiplexed input signal beyond selected upper and lower current or voltage limits. The clipped broadband signal is represented as a stationary Gaussian process to provide a reliable estimate of the carrier-to-nonlinear distortion per channel that would be experienced with a given laser or optical modulator which may be either directly and externally modulated. The clipping levels can be set to avoid the unpredictable levels of nonlinear distortion of the modulator and thereby to achieve an acceptably low level of non-linear distortion of the modulator.

10 Claims, 6 Drawing Sheets

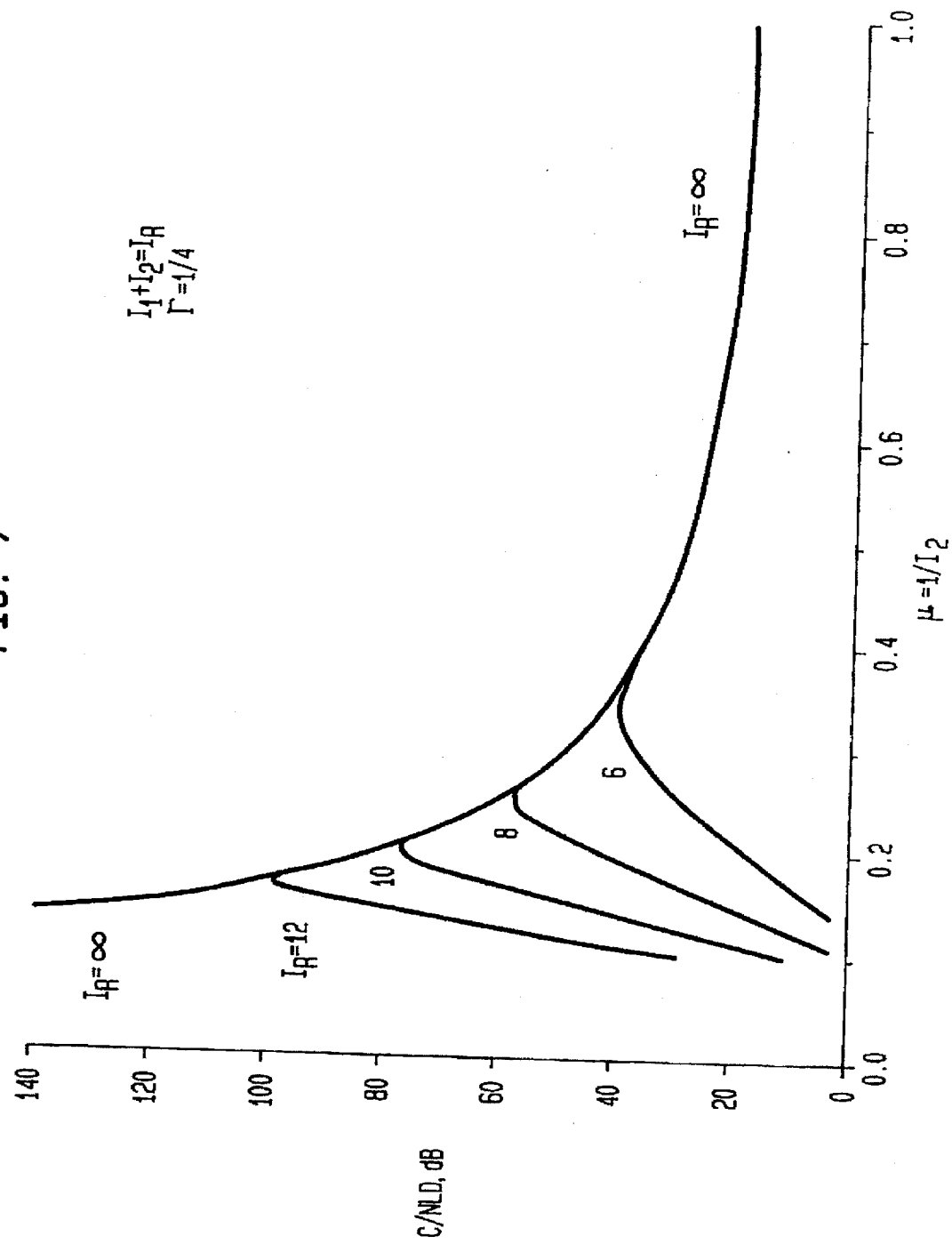

SYSTEM AND METHOD FOR MINIMIZING NONLINEAR DISTORTION IN OPTICAL COMMUNICATION SYSTEMS EMPLOYING LASER INTENSITY MODULATION

This is a continuation of application Ser. No. 08/382,552, filed Feb. 2, 1995 now abandoned.

FIELD OF THE INVENTION

The present invention relates to communications systems and, more particularly, to multicarrier systems such as cable television systems, or CATV.

BACKGROUND OF THE INVENTION

The problems of nonlinear distortion and limited dynamic range in multicarrier, multichannel communication systems, such as CATV, have received renewed attention with the advent of optical fiber and lasers being used in the distribution of television signals.

High speed optical transmitters are increasingly being employed in communications applications, but these applications are generally digital transmissions wherein signal linearity is hardly an issue of concern. If, however, digital transmission were used in a CATV system, the costs of installing digital-to-analog converters at each end user would be prohibitive. Thus, due to the fact that essentially no cost is incurred at the end user when the signal format is compatible with existing television receivers and VCR's, the advantages of carrying analog multichannel waveforms on optical links cannot be overlooked.

In a typical optical CATV system, many amplitude modulated vestigial-sideband (AM-VSB) channels on individual subcarriers are summed to form a broadband multiplexed signal which is used either to directly modulate the intensity of a laser (direct modulation) or to modulate the output of a laser operating in CW mode (external modulation). The subcarriers may contain, for example, digital modulation such as quadrature AM for compressed digital video. While optical transmission losses are only of the order of 0.5 dB per kilometer, a challenge is encountered in minimizing nonlinear distortion components and increasing dynamic range, given performance limitations and high cost of currently available optical transducers, for instance, lasers, external optical modulators and light amplifiers.

Recent developments in both directly modulated and externally modulated optical transmitters show significant improvements in their analog characteristics. In directly modulated systems, for example, improvements have been made in the linearity, optical power and linear dynamic range of semiconductor lasers. Unfortunately, the linearity limitations for current practice CATV analog transmissions requiring multicarrier amplitude modulation (AM) place a severe limit on channel capacity and loss budgets, i.e., the allowed loss in signal power that provides adequate dynamic range. During large negative excursions of the multiplexed signal, for example, clipping of the laser intensity occurs which induces nonlinear distortion (i.e. intermodulation noise) in all of the individual channels. Additionally, large positive excursions beyond the saturation point of the laser can cause highly unpredictable levels of nonlinear distortion and is currently avoided by selecting a laser having a sufficiently long linear region to preclude such excursions. The amount of nonlinear distortion is typically characterized in terms of a carrier-to-nonlinear distortion (C-NLD) ratio.

In the case of directly modulated lasers, a conventional technique for controlling the nonlinear distortion of laser intensity modulation is to set the laser bias current, $I_b$, high enough to ensure that the laser always operates above the laser threshold current but below the saturation current threshold and, thus, in the linear range. Such operation, however, leads to increased power dissipation and increased shot noise at the photodetector. Moreover, although lasers capable of such elevated bias point operation are available, they are expensive to fabricate and must be specially constructed for the particular application. Further improvements in the performance and price of optical transmission devices is clearly needed.

In an externally modulated laser, the transfer function of the modulator is sinusoidal and the modulator is typically biased as close as possible to the quadrature point to suppress second harmonic components. Although the bias applied is a voltage bias rather than a current bias, large excursions of the broadband multiplexed signal in either direction relative to the linear range will also result in undesirable levels of non-linear distortion. Here again, the modulator used in a conventional transmitter must be specially configured to provide a sufficiently long linear range to accommodate elevated bias point operation.

SUMMARY OF THE INVENTION

In accordance with the present invention, the level of non-linear distortion in the output of an optical transmitter is preset to an acceptable level by using an amplitude limiting device to clip a broadband multiplexed signal. To determine whether the level of non-linear distortion is acceptable in a given application, an approximate value of the carrier-to-nonlinear distortion per channel is obtained by representing the clipped broadband signal as a stationary Gaussian process.

In accordance with an illustrative embodiment of the present invention, the amplitude limiter is utilized to select the most favorable linear region of the light vs. current characteristic of an intensity modulated laser by controlling excursions of the broadband multiplexed signal beyond selected upper and lower current limits such, for example, as the saturation point $I_s$, and threshold, $I_{th}$, of the laser diode. By setting upper and lower limits in this manner, the unpredictable levels of non-linear distortion associated with excursions of the broadband multiplexed signal beyond the linear region of the laser diode are avoided. Instead, the exact spectra of the clipping distortion resulting from laser intensity modulation with a clipped signal may be predicted by employing noise theory and numerical analysis.

The clipping technique of the present invention is equally applicable to transmitting systems employing directly and externally modulated lasers, and the amount of distortion introduced by the clipping process will depend on the clipping levels, the dynamic range of the laser, or modulator and spectral shape of the multiplexed broadband signal. The present invention makes it possible to determine in advance whether a particular laser or modulator, which might heretofore have been rejected as having, for example, an insufficient linear range, may be used for a particular application. As such, it may now be possible to utilize less expensive laser diodes or modulators despite, in a directly modulated laser for example, non-linear behavior near threshold and saturation.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE DRAWINGS

In the drawings, wherein like reference characters denote similar elements throughout the several views:

FIGS. 5, 6 and 7 are curves depicting C/NLD ratios for asymmetrical clipping levels $I_1$ and $I_2$ in accordance with the present invention.

DETAILED DESCRIPTION OF THE PRESENTLY PREFERRED EMBODIMENTS

Although the amplitude limiting technique of the present invention will be described in detail in connection with the control of non-linear distortion in a system employing a directly modulated laser, it should be emphasized that it may also be utilized in a system employing an externally modulated laser to prevent excursions of a multiplexed broadband signal beyond the linear range of the modulator's transfer function.

Figure 1:
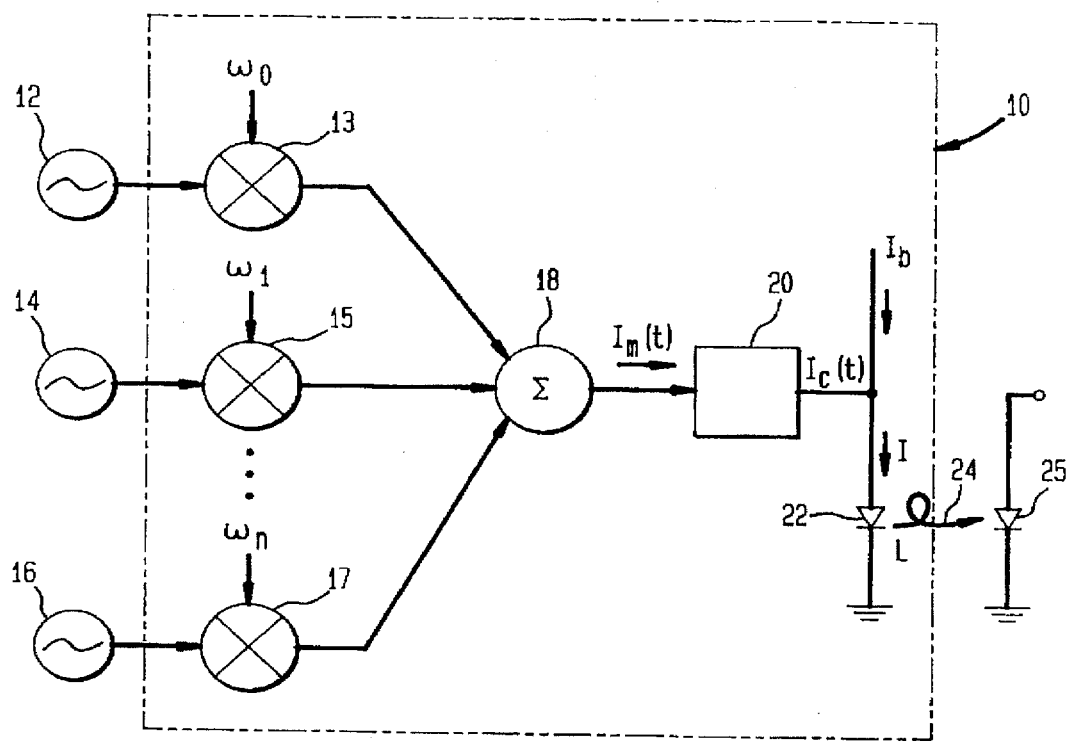
FIG. 1 is a block diagram of a sub-carrier multiplexed optical communication system utilizing an amplitude limiter for clipping broadband signal $I_m(t)$ in accordance with the present invention.

Referring now to FIG. 1, there is shown an amplitude modulated-vestigial sideband sub-carrier multiplexed transmission system 10 utilizing a directly modulated laser diode and the distortion control technique of the present invention. Illustratively, system 10 is a CATV system in which several baseband frequency modulation television channels 12, 14, and 16 are conventionally frequency division multiplexed by multipliers 13, 15 and 17, respectively, on different carrier frequencies $\omega_0$, $\omega_1$ and $\omega_n$, respectively, as separate amplitude modulated-vestigial sideband subcarriers, in a multiplexed input $I_m$ signal. A summer 18 combines the individual television channels at the different sub-carrier frequencies into the multiplexed input signal $I_m(t)$ without distortion.

Figure 2:
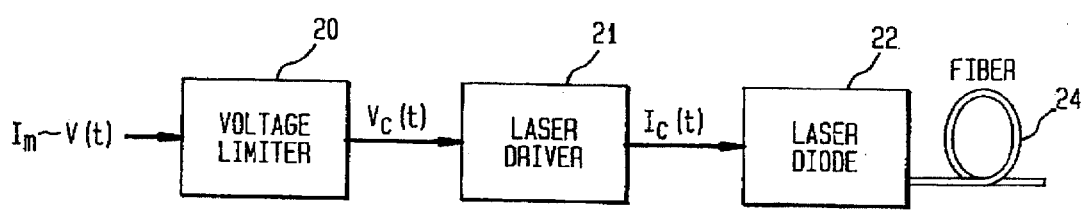
FIG. 2 is a block diagram of a directly modulated laser system employing a voltage limiting device in accordance with an illustrative embodiment of the present invention.

The multiplexed signal $I_m(t)$ is received by amplitude limiter 20, which outputs a broadband current signal $I_c(t)$ that is clipped at one or more predetermined limits selected to confine intensity modulation of the laser diode 22 to its linear region. It will be readily appreciated by those skilled in the art that the clipped signal output by limiter 20 may be either a current signal such as $I_c(t)$ or a voltage signal $V_c(t)$, as shown in FIG. 2. Thus, any suitable limiter circuit may be utilized to obtain the most favorable linear region of the light versus current intensity modulation or, in the case of an externally modulated laser, the modular transfer function. By way of particular example, reference may be had to U.S. Pat. No. 3,949,317 to Crosby entitled "FAST RECOVERY LIMITING AND PHASE INVERTING AMPLIFIER", the disclosure of which patent is expressly incorporated herein by reference in its entirety. Returning to FIG. 1, the clipped broadband signal $I_c(t)$ is supplied to a laser diode 22 as a part of a total laser drive current I and launched into an optical waveguide such as optical fiber 24 to be received by photodetector 25. The total laser drive current, or injection current, I to the laser diode 22 includes both a dc bias current $I_B$ and the clipped composite multiplexed input signal $I_c(t)$ from limiter 20.

Figure 3:
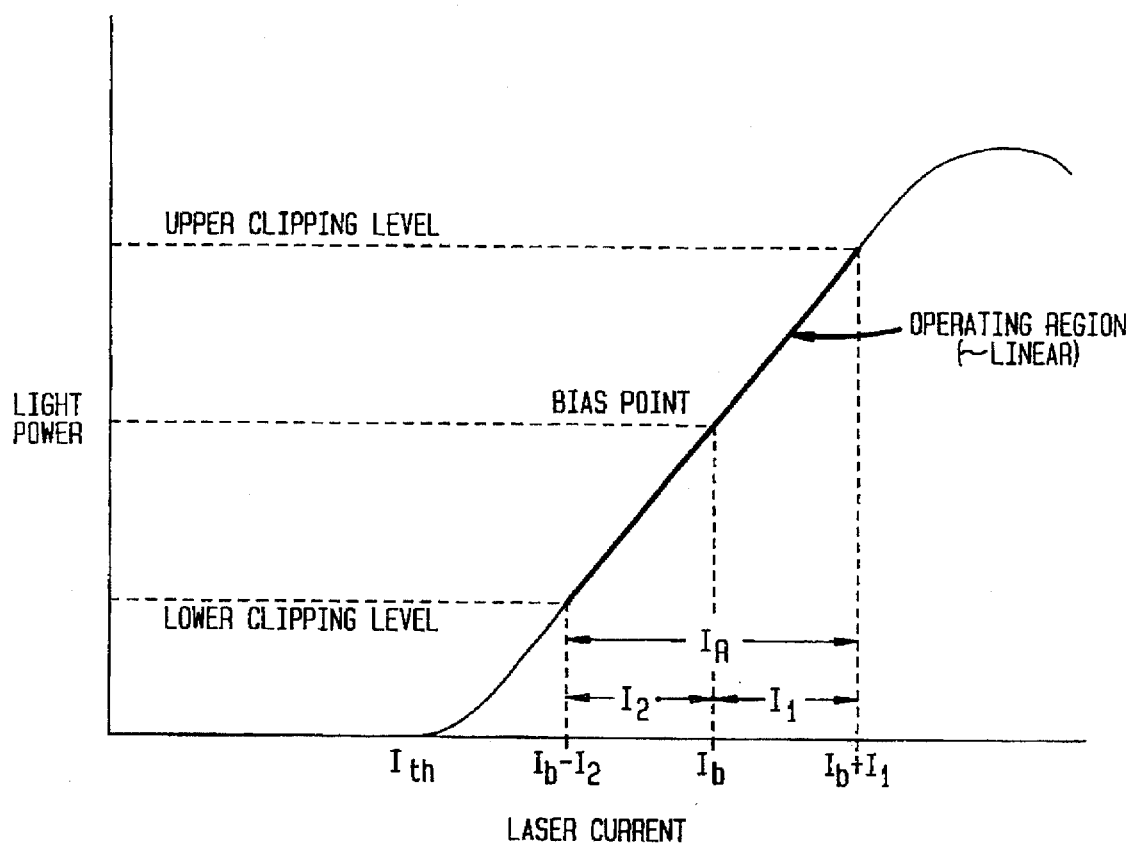
FIG. 3 is a light power versus drive current characteristic curve for a laser diode.

In accordance with the illustrative embodiment of the present invention depicted in FIG. 2, the amplitude limiter 20 is configured to convert a broadband input voltage signal V(t), which signal is proportional to signal $I_m(t)$, to a clipped signal voltage $V_c(t)$. The clipped signal $V_c(t)$ is supplied to laser driver 21 which, in turn, supplies a clipped, intensity modulated signal $I_c(t)$ to laser diode 22 which launches a signal into an optical waveguide, such as optical fiber 24. The number of channel signals in the laser drive current may be as many as eighty or more bands of frequencies throughout a range of frequencies from 1 MHz to 1 GHz. For a perfectly linear laser, its output optical signal power varies directly with the magnitude of the applied laser drive current. As will be described in detail below with reference to FIG. 3, the broadband signal $I_m(t)$ is clipped by limiter 20 so as to remain between upper and lower values $I_b+I_2$ and $I_b-I_2$, which values are selected to confine the intensity modulation of the laser to the linear region. By clipping the intensity modulation just slightly above the threshold bias current of the laser, for example, the substantial nonlinear distortion caused by large excursions of the broadband signal into the nonlinear region are avoided.

It will, of course, be immediately apparent to those skilled in the art that while clipping can be used to prevent excursions into the nonlinear regions of the laser and thus eliminate the nonlinear distortion associated therewith, the action of the signal in accordance with the present invention clipping also causes nonlinear distortion of the laser intensity modulation. However, and as will now be described in detail, noise theory and numerical analysis may be used to compute the nonlinear distortion associated with symmetrical or asymmetrical clipping of an intensity modulated broadband signal. As a result, it is possible to define, by clipping, an optimal linear region of a given laser such that nonlinear distortion is minimized and maintained at or below a level suitable for a given application involving analog, digital, or mixed modulation.

AVERAGE POWER OF A CLIPPED GAUSSIAN PROCESS

Figure 4A:
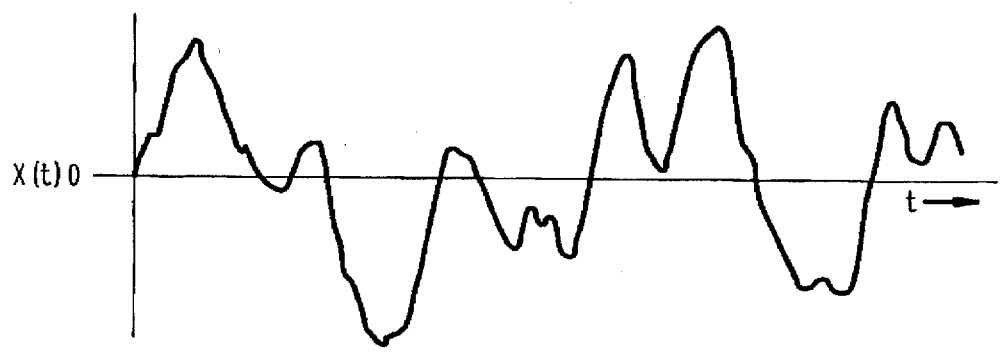
FIG. 4A is an unclipped stationary Gaussian process X(t) corresponding to the unclipped, broadband signal $I_m(t)$ of FIG. 2.
Figure 4B:
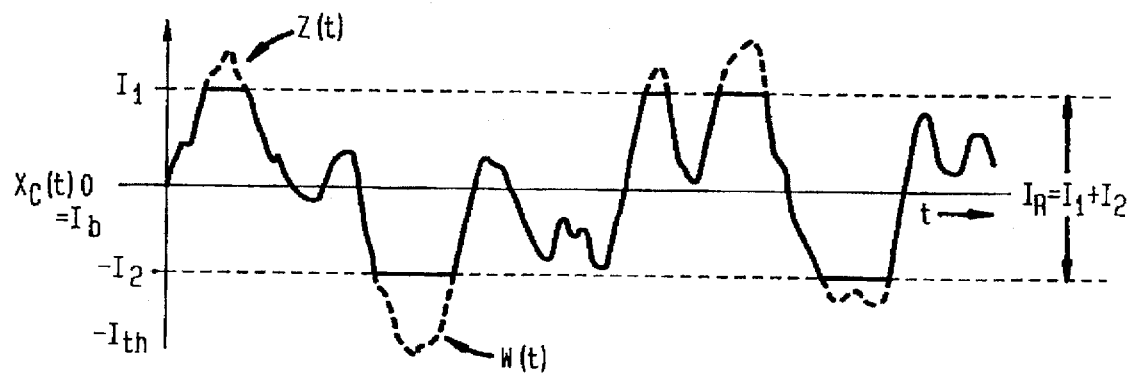
FIG. 4B depicts $X_c(t)$, the stationary Gaussian process of FIG. 4A clipped at two levels $I_1$ and $I_2$ and corresponding to $I_c(t)$ of FIG. 2.

To best understand how the distortion power associated with laser intensity modulation may be computed, it is helpful to consider a general formula for computing the average power of a stationary Gaussian process that is clipped at one or two arbitrary levels. With reference now to FIGS. 4A and 4B, there is shown in FIG. 4A a stationary Gaussian process X(t) in an unclipped form and in FIG. 4B a clipped stationary process $X_c(t)$ corresponding, for example, to the signal $I_c(t)$ clipped at the levels $I_1$ and $I_2$ of FIG. 3. X(t) and $X_c(t)$ may, in fact, be used to represent any unclipped and corresponding clipped broadband analog signal to facilitate computation of non-linear distortion corresponding, for example, to the unclipped, broadband signal $I_m(t)$ of FIG. 2.

With particular reference to FIG. 4B, $I_R=I_1+I_2$ denotes the dynamic range of the clipping levels $I_1$ and $-I_2$. X(t) represents a zero mean, unit variance stationary Gaussian process of one-sided power spectral density $W_x(f)$. As seen in FIG. 4b, X(t) is represented by a clipped process $X_c(t)$ and two excursion processes Z(t) and W(t), yielding the relation:

$$X(t) = X_c(t) + Z(t) + W(t)$$

where $X_c(t)$=clipped version of $X(t)$ $$Z(t) = \begin{bmatrix} X(t) - I_1 & \text{for } X(t) \geq I_1 \\ 0 & \text{otherwise} \end{bmatrix} \quad (1)$$

and $$W(t) = \begin{bmatrix} X(t) + I_2 & \text{for } X(t) \leq -I_2 \\ 0 & \text{otherwise} \end{bmatrix}.$$

At any time t, equation (1) can be written as:

$$X_c = X - Z - W. \quad (2)$$

The average continuous power, $P_c$, of the clipped Gaussian process $X_c(t)$ is given by the variance of $X_c(t)$ or:

$$P_c = E[X_c - E(X_c)]^2 = E[X_c^2] - [EX_c]^2, \quad (3)$$

where E denotes the expectation.

To determine $P_c$, the first and second moments of Z and W are needed. These are given by:

$$EZ = \phi(I_1) - I_1\Phi(-I_1),$$
$$EZ^2 = (1 + I_1^2)\Phi(-I_1) - I_1\phi(I_1), \quad (4)$$
$$EW = -EZ|_{I_1=I_2},$$
$$EW^2 = EZ^2|_{I_1=I_2},$$

where $$\phi(X) = \frac{e^{-x^2/2}}{\sqrt{2\pi}} \quad (5)$$

and $$\Phi(x) = \int_{-\infty}^{X} \phi(z)dz. \quad (6)$$

Using the moments in equation (3) results in the following general expression for $P_c$:

$$P_c = 1 - [(I_1^2 + 1)\Phi(-I_1) - I_1\phi(I_1)] - [(I_2^2 + 1)\Phi(-I_2) - I_2\phi(I_2)] + \quad (7)$$

$$2I_1[I_1\Phi(-I_1) - \phi(I_1)] + 2I_2[I_2\Phi(-I_2) - \phi(I_2)] - [I_1\Phi(-I_1) - \phi(I_1)]^2 +$$

$$2[I_1\Phi(-I_1) - \phi(I_1)][I_2\Phi(-I_2) - \phi(I_2)] - [I_2\Phi(-I_2) - \phi(I_2)]^2.$$

In the case of symmetrical clipping, $I_1 = I_2 = I$ and equation (7) reduces to:

$$P_c = 1 - 2[I\phi(I) + (1 - I^2)\Phi(-I)]. \quad (8)$$

For clipping at only the level $-I_2$, $I_1 \rightarrow \infty$ and equation (7) reduces to:

$$P_c = 1 - \phi(I_2)[\phi(I_2) + I_2] - \Phi(-I_2)[1 - 2I_2\phi(I_2) - I_2^2\Phi(I_2)]. \quad (9)$$

CARRIER-TO-NONLINEAR DISTORTION RATIO

Let $X(t)$ now represent a frequency multiplexed, broadband analog signal having a one-sided power spectral density $W_x(f)$ which represents N contiguous channels of equal power and extends from $f_a$ to $f_b$. In order to determine the total nonlinear distortion power, included in the continuous power, $P_c$, of $X_c(t)$, the following relation is considered:

$$P_c = \int_0^\infty W_c(f)df = h_{01}^2\sigma^2 + P_d,$$

where $W_c(f)$=continuous portion of the power spectral density of $X_c(t)$ $h_{01}$=signal suppression factor  (10)

$P_d$=AC nonlinear distortion power (i.e. intermodulation noise)

$$\sigma^2 = \int_{f_a}^{f_b} W_x(f)df = 1.0 = \text{the variance or power of } X(t).$$

For clipping at two arbitrary levels $I_1$ and $-I_2$, $h_{01}$ is given by $$h_{01} = \Phi(I_2) - \Phi(-I_1). \quad (11)$$

Accordingly, as a conservative approximation, the signal or "carrier"-to-nonlinear distortion power ratio, C/NLD, is given by $$C/NLD = \frac{h_{01}^2\sigma^2}{P_d} = \frac{h_{01}^2}{P_c - h_{01}^2}. \quad (12)$$

If it is assumed that the signal or "carrier" power, $h_{01}^2$, and the nonlinear distortion power, $P_d$, are both distributed uniformly among the N contiguous frequency bands or channels of interest, then equation (12) also represents the C/NLD ratio per channel. If it is known that only a fraction, $\Gamma$, of the total nonlinear distortion power, $P_d$, is distributed uniformly among the N continuous channels of interest, equation (12) generalizes to:

$$C/NLD = \frac{h_{01}^2\sigma^2}{\Gamma P_d} = \frac{h_{01}^2}{\Gamma[P_c - h_{01}^2]} \quad (13)$$

where $$\Gamma P_d = \int_{f_a}^{f_b} W_c(f)df - h_{01}^2\sigma^2.$$

$W_c(f)$ depends upon the power spectral density, $W_x(f)$, of the broadband analog signal $X(t)$ while $P_d$ is independent of $W_x(f)$ and is given by equations (7), (10) and (11). The most conservative value of the approximated C/NLD ratio is obtained when $\Gamma = 1.0$, at which point the computed C/NLD ratio is independent of the bandwidth or spectral location of the broadband analog signal. However, as will later be seen with reference to FIGS. 5–7, very accurate results also show that controlled dynamic range, $I_R$, and other values of r result in much higher C/NLD ratios.

Utilizing equation (13), the C/NLD ratio associated with the intensity modulation of a laser can now be computed. The relation between $\mu$, the total RMS modulation index, and the AC power of the broadband analog signal, $\sigma^2$, is given by:

$$\sigma^2 = I^2_2 \mu^2$$

where $$\mu^2 = Nm^2 I_2 \quad (14)$$

N=Number of channels multiplexed
m=Optical modulation index per channel.

Figure 5:
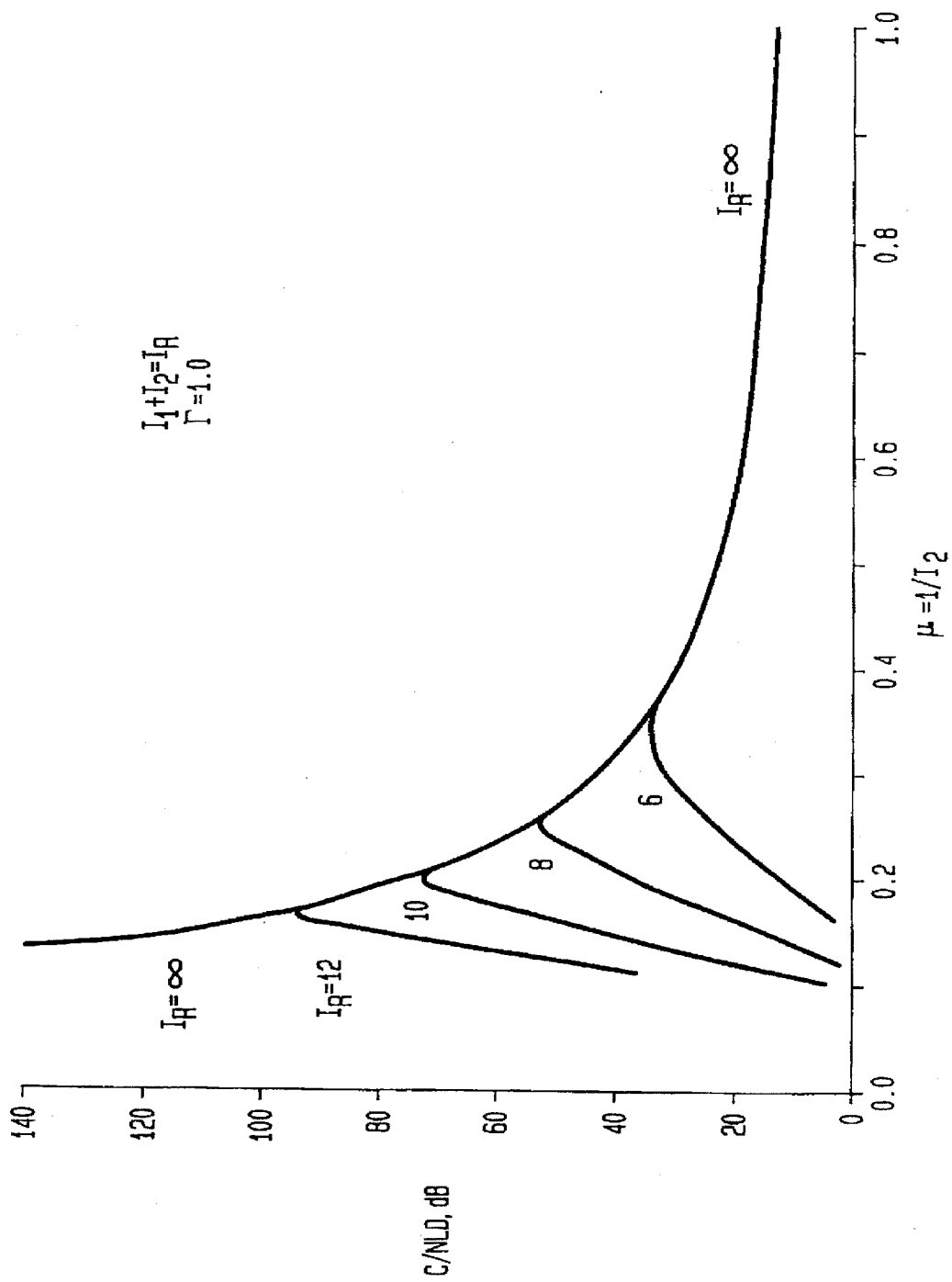
Figure 6:
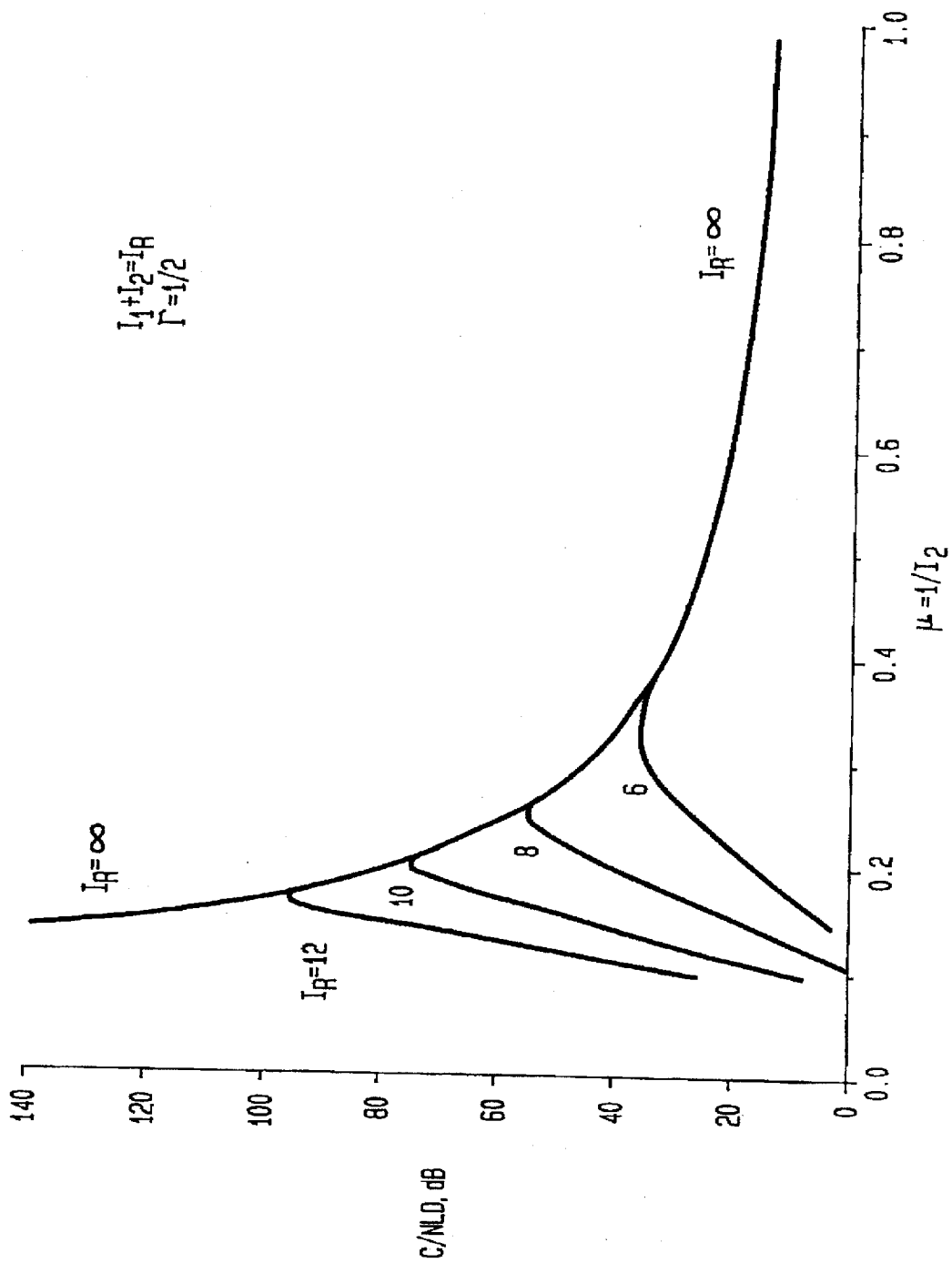

For laser intensity modulation, it is most efficient to make μ as large as possible. As μ increases, however, $I_2$ decreases, potentially resulting in significant clipping of the broadband analog signal X(t) and induced distortion in all of the individual channels. Letting $\sigma^2=1$ and $\mu=1/I_2$ in the case of asymmetrical clipping, FIGS. 5–7 show the C/NLD ratio for Γ=1.0, 0.5, and 0.25. The dynamic range of the clipping levels is indicated as $I_R=I_1+I_2$. In each case, the computed C/NLD value very closely approached those obtained empirically.

From the foregoing, it should now be readily apparent that the nonlinear distortion resulting from large excursions of a wideband modulating signal can be prevented by clipping the signal. Moreover, the difficult-to-compute, highly laser dependent distortion introduced by such excursions, the nonlinear distortion introduced by clipping the signal can, in accordance with the present invention, be readily and accurately computed. In fact, limiting the amplitude of the broadband signal provides a means of jointly optimizing the various orders of distortion, modal suppression, power dissipation, conversion efficiency, and shot noise at the photodetector.

Utilizing the teachings of the present invention, laser diodes and modulators heretofore deemed unusable due to an insufficient distortion-free, dynamic range, may now be utilized for lightwave applications involving analog, digital, or mixed modulation such, for example, as subcarrier multiplexing. The C/NLD ratio can be readily computed, for example, for a laser clipped at a given level to determine its suitability for the desired application. Eliminating the operating regions below the laser threshold and above the saturation region, one may now select the linear region most favorable to the application. This enables the use of less expensive laser diodes while ensuring a level of performance that is less dependent upon the nonlinear performance of the laser diode near the threshold and saturation points.

By way of particular example, in a recently introduced CATV laser diode, the optimal operating value is μ=0.25 or $I_2$=4.0. At this operating point, the carrier-to-nonlinear distortion ratio for CATV applications is limited to about 60 dB. This value is now very near the minimum target value of 58 dB. It is expected that an additional improvement of up to 10 dB can be achieved in such a laser diode using an amplitude limiter to decrease nonlinear distortion, making the benefits of the present invention immediately apparent.

While there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, however, therefore, to be limited only as indicated by the scope of the claims appended hereto.

What is claimed is:

1. An optical transmitter system comprising:

an electronically adjustable amplitude limiting means for receiving and processing a multiplexed composite modulated electrical input signal representative of a plurality of multiplexed communication channels and for transmitting in response thereto a limited composite modulated electrical signal; and an optical output means for receiving the limited composite electrical signal and for generating modulated optical signal in response thereto, the optical signal having an output power being substantially linearly proportional to the received limited composite modulated electrical signal between a lower electrical clipping level and an upper electrical clipping level;

wherein the limited composite modulated electrical signal transmitted by said electronically adjustable amplitude limiting means is adjusted and processed so as to be between the lower electrical clipping level and the upper electrical clipping level of the optical output means for all possible multiplexed composite modulated electrical input signal values.

2. The optical transmitter system of claim 1, wherein said optical output means comprises a laser intensity modulated along a linear current vs. light intensity region.

3. The optical transmitter system of claim 1, wherein the lower electrical clipping level is an activation threshold of said optical output means.

4. The optical transmitter system of claim 3, wherein the upper electrical clipping level is below a saturation point of said optical output means.

5. The optical transmitter system of claim 1, wherein the upper electrical clipping level is a saturation point of said optical output means.

6. The optical transmitter system of claim 1, wherein the multiplexed composite modulated electrical signal received by said amplitude limiting means is a modulated voltage signal and wherein said amplitude limiting means is a voltage limiter.

7. The optical transmitter system of claim 1, wherein said optical output means comprises a modulator and a continuous output laser optically coupled thereto, said modulator having a periodic transfer function with a linear portion and being responsive to the limited composite modulated electrical signal to modulate light output of said laser along said linear portion.

8. The optical transmitter system of claim 7, wherein said amplitude limiting means is a voltage limiter.

9. The optical transmitter system of claim 1, wherein the multiplexed composite modulated electrical signal received and processed by said amplitude limiting means comprises an amplitude modulated signal.

10. The optical transmitter system of claim 1, wherein the multiplexed composite modulated electrical signal received and processed by said amplitude limiting means comprises a quadrature amplitude modulated signal.

* * * * *